United States Patent
Ikegami et al.

(10) Patent No.: US 7,437,126 B2
(45) Date of Patent: Oct. 14, 2008

(54) RADIO TERMINAL, COMMUNICATION CONTROL METHOD AND COMPUTER PROGRAM

(75) Inventors: Fumihiko Ikegami, Yokohama (JP); Kazuaki Iwamura, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/214,921

(22) Filed: Aug. 31, 2005

(65) Prior Publication Data

US 2005/0282497 A1 Dec. 22, 2005

Related U.S. Application Data

(62) Division of application No. 10/612,034, filed on Jul. 3, 2003, now Pat. No. 6,993,348.

(30) Foreign Application Priority Data

Jul. 4, 2002 (JP) ............................. 2002-195955

(51) Int. Cl.
*H04B 7/00* (2006.01)
(52) U.S. Cl. .................... 455/41.2; 455/422.1
(58) Field of Classification Search ................ 455/557, 455/456.1, 456.3, 455, 560
See application file for complete search history.

(56) References Cited

U.S. PATENT DOCUMENTS

| | | | |
|---|---|---|---|
| 5,867,796 A | 2/1999 | Inutsuka | |
| 6,078,572 A * | 6/2000 | Tanno et al. | 370/335 |
| 6,825,830 B1 | 11/2004 | Kanesaka et al. | |
| 2002/0055370 A1 | 5/2002 | Chen | |
| 2002/0065045 A1 | 5/2002 | Kim | |
| 2002/0081992 A1 | 6/2002 | Keller et al. | |
| 2002/0108038 A1 | 8/2002 | Tanaka et al. | |
| 2002/0137526 A1 * | 9/2002 | Shinohara | 455/456 |
| 2003/0008670 A1 * | 1/2003 | Katoh | 455/456 |
| 2003/0023694 A1 | 1/2003 | Macor | |
| 2004/0209627 A1 * | 10/2004 | Shiraga | 455/456.1 |
| 2004/0242203 A1 | 12/2004 | Lipsanen et al. | |

FOREIGN PATENT DOCUMENTS

| | | |
|---|---|---|
| JP | 2001-168881 | 6/2001 |
| JP | 2001-223712 | 8/2001 |
| JP | 2001-339408 | 12/2001 |
| KR | 2001-0051049 | 6/2001 |

OTHER PUBLICATIONS

Pravin Bhagwat, "Bluetooth: Technology for Short-Range Wireless Apps", IEEE Internet Computing, XP-008062347, May 2001, pp. 96-103.

(Continued)

*Primary Examiner*—Duc Nguyen
*Assistant Examiner*—Dai A Phuong
(74) *Attorney, Agent, or Firm*—Oblon, Spivak, McClelland, Maier & Neustadt, P.C.

(57) ABSTRACT

A radio terminal corresponding to a first radio terminal associated with a second radio terminal comprises following units. A first receiving unit receives a first request issued from the second radio terminal. An establishing unit establishes, in response to the first request, a radio link with respect to the second radio terminal. A setting unit sets, on the radio link, a connection with the second radio terminal. A detecting unit detects an event in association with the second radio terminal. A first transmitting unit transmits, to the second radio terminal via the connection, a first request message representing that first service information concerning the second radio terminal should be transmitted to the first radio terminal, when the detecting unit detects the event.

14 Claims, 10 Drawing Sheets

OTHER PUBLICATIONS

Eugene A. Gryazin, "Service Discovery In Bluetooth", Bluetooth Technology and Utilization Course, XP-002311799, Nov. 9, 2001, 4 pages.

"Part K:2, Service Discovery Application Profile", Specification of the Bluetooth System, vol. 2, XP-002306129, Feb. 22, 2001, pp. 63-98.

* cited by examiner

| Service type | Service name | Server channel number |
|---|---|---|
| File Transfer | "File Transfer" | 1 |
| Object Push | "Object Push" | 2 |

| Terminal identifier | Service type | Service name | Server channel number |
|---|---|---|---|
| 00:11:12:33:44:55 | File Transfer | "File Transfer" | 1 |
| 00:11:12:33:44:66 | Object Push | "Object Push" | 2 |
| | Dialup Network | "Dialup" | 1 |

| Terminal identifier | Service type | Service name | Server channel number | Service aquisition time |
|---|---|---|---|---|
| 00:11:12:33:44:55 | File Transfer | "File Transfer" | 1 | 12:50:03 |
| 00:11:12:33:44:66 | Object Push | "Object Push" | 2 | 12:50:03 |
| | Dialup Network | "Dialup" | 1 | 12:40:28 |

RADIO TERMINAL, COMMUNICATION CONTROL METHOD AND COMPUTER PROGRAM

The present application is a Divisional of U.S. application Ser. No. 10/612,034, filed on Jul. 3, 2003, and in turn claims priority to Japanese Patent Application No. 2002-195955, filed Jul. 4, 2002, the entire contents of both of which are incorporated herein by reference.

CROSS-REFERENCE TO RELATED APPLICATIONS

This application is based upon and claims the benefit of priority from the prior Japanese Patent Application No. 2002-195955, filed Jul. 4, 2002, the entire contents of which are incorporated herein by reference.

BACKGROUND OF THE INVENTION

1. Field of the Invention

The present invention relates to a radio terminal, a communication control method and a computer program utilizing, for example, a radio connection technique "Bluetooth (trademark)".

2. Description of the Related Art

Recently, much attention has been paid to Bluetooth (trademark). Components needed for Bluetooth are less expensive than those needed for a radio LAN, and Bluetooth can be used anywhere in the world, utilizing the 2.4 GHz band.

In communication terminals utilizing Bluetooth, a virtual COM port (RFCOMM) is generally used for data transmission/reception. Connection via a virtual COM port (RFCOMM connections) is carried out by the following procedure.

Firstly, a device C starts to execute a Device Discovery procedure for discovering devices existing in the vicinity. In this procedure, the device C broadcasts an Inquiry message, and another device S having received this message returns, to the device C, a response message that includes its own identifier (MAC ID). Thus, the device C can know the identifiers of other devices around it.

Subsequently, the device C acquires service information (Service Record), utilizing the following procedure based on Service Discovery Protocol (SDP).

The device C establishes a connection (SDP connection) for acquiring service information with respect to a device discovered by the device discovery procedure, e.g. the device S. After that, the device C requests, to the device S, return of service information relating to a target service. Upon receiving the request, the device S returns this service information to the device C. After receiving the service information from the device S, the device C disconnects the SDP connection. This device discovery procedure and service information acquiring procedure are disclosed in, for example, Jpn. Pat. Appln. KOKAI Publication No. 2001-168881.

In the above service discovery protocol, however, only one-way transfer of service information is performed by the device S having received a return request, to the device C having made the request, but not vice versa.

After that, the device C performs a virtual COM port connection, using, as parameters, the identifier (MAC ID) of the device S obtained by the device discovery procedure, and a server channel number stored in the service information obtained from the service discovery protocol. As a result, a RFCOMM connection is established between the devices C and S for data transmission/reception.

If the device C pre-acquires a device identifier and server channel number as parameters necessary to establish a RFCOMM connection, the above-described procedure for acquiring service information can be omitted. However, in general, users cannot be expected to pre-acquire the parameters of an arbitrary communication device, therefore the above procedure is needed.

In Bluetooth, to establish an SDP connection or a RFCOMM connection, it is necessary to create a network called a "piconet", which is formed of one master device and one or more slave devices. Between a master device and slave device that belong to same piconet, the SDP connection and the RFCOMM connection are superposed on a baseband link by a logical link (L2CAP (Logical Link Control and Adaptation Layer Protocol)). Thus, a plurality of connections can be simultaneously established between the devices. Further, these connections can be established by either the master or slave device.

Since connections can be superposed between devices that belong to the same piconet, another connection can be easily established between devices that are communicating with each other via a certain connection. For example, when devices are accessing each other using a virtual COM port and a RFCOMM connection, an SDP connection can also be established therebetween to acquire service information, or another RFCOMM connection can be established.

However, in general use of Bluetooth, it is often impossible to create a new piconet between a device belonging to a certain piconet, and a device that does not belong to this piconet. In other words, when two devices are linked to each other, it is difficult for a third device to establish a link with one of the already-linked devices. If a link cannot be established, a connection for data transmission/reception cannot be established. Therefore, it is difficult for the third device to establish a connection for data transmission/reception with one of those devices.

The above describes a RFCOMM connection as an example. Service information relating to a destination device is always needed to access it utilizing the Bluetooth profile. For example, in a Personal Area Network (PAN), communication is performed without a RFCOMM connection. However, service information is needed to establish a PAN.

When portable devices having a communication function are used to perform a certain function, it may be necessary to transmit information from one device to another device. In an electronic conference, for example, material prepared in the form of a file stored in each portable device is distributed to other devices, or message exchange is performed using a chat function.

However, as described above, service information relating to a destination device is needed to establish a connection for data transmission/reception. Thus, to establish a connection with an arbitrary device to freely execute communication, it is necessary for each device to pre-acquire service information relating to all the other devices.

It is difficult, however, to establish an SDP connection between a third device and first or second device when the first and second devices are linked for communication. Therefore, it is also difficult to quickly acquire service information. Further, even if an SDP connection can be established, only one-way transmission of service information is executed from the device with which a connection is established to the device that has established the connection. This is inefficient.

BRIEF SUMMARY OF THE INVENTION

Embodiments of the present invention has been developed in light of the above, and aims to provide a radio terminal capable of quickly acquiring service information necessary to establish a connection with a destination radio terminal, and a communication control method and a computer program enabling a radio terminal to perform such acquisition.

To satisfy the aim, according to a first aspect of the invention, there is provided a radio terminal corresponding to a first radio terminal associated with a second radio terminal, comprising: a first receiving unit configured to receive a first request issued from the second radio terminal; an establishing unit configured to establish, in response to the first request, a radio link with respect to the second radio terminal; a setting unit configured to set, on the radio link, a connection with the second radio terminal; a detecting unit configured to detect an event in association with the second radio terminal; and a first transmitting unit configured to transmit, to the second radio terminal via the connection, a first request message representing that first service information concerning the second radio terminal should be transmitted to the first radio terminal, when the detecting unit detects the event.

According to a second aspect of the invention, there is provided a communication control method of setting a connection on a radio link between a first radio terminal and a second radio terminal, the communication control method comprising: detecting an event in association with the second radio terminal; transmitting, to the second radio terminal via the connection, a first request message representing that first service information concerning the second radio terminal should be transmitted to the first radio terminal, when the event is detected; and receiving the first service information.

According to a third aspect of the invention, there is provided a computer program stored in a computer readable medium provided in a first radio terminal associated with a second radio terminal, the computer program comprising: first receiving means for instructing a computer to receive a first request issued from the second radio terminal; first transmitting means for instructing a computer to transmit a second request; means for instructing a computer to establish, in response to one of the first request and the second request, a radio link with respect to the second radio terminal; means for instructing a computer to set, on the radio link, a connection with the second radio terminal; means for instructing a computer to detect an event in association with the second radio terminal; and second transmitting means for instructing a computer to transmit, to the second radio terminal via the connection, a first request message representing that first service information concerning the second radio terminal should be transmitted to the first radio terminal, when the detecting means detects the event.

DETAILED DESCRIPTION OF THE INVENTION

Embodiments of the invention will be described with reference to the accompanying drawings.

Figure 1:
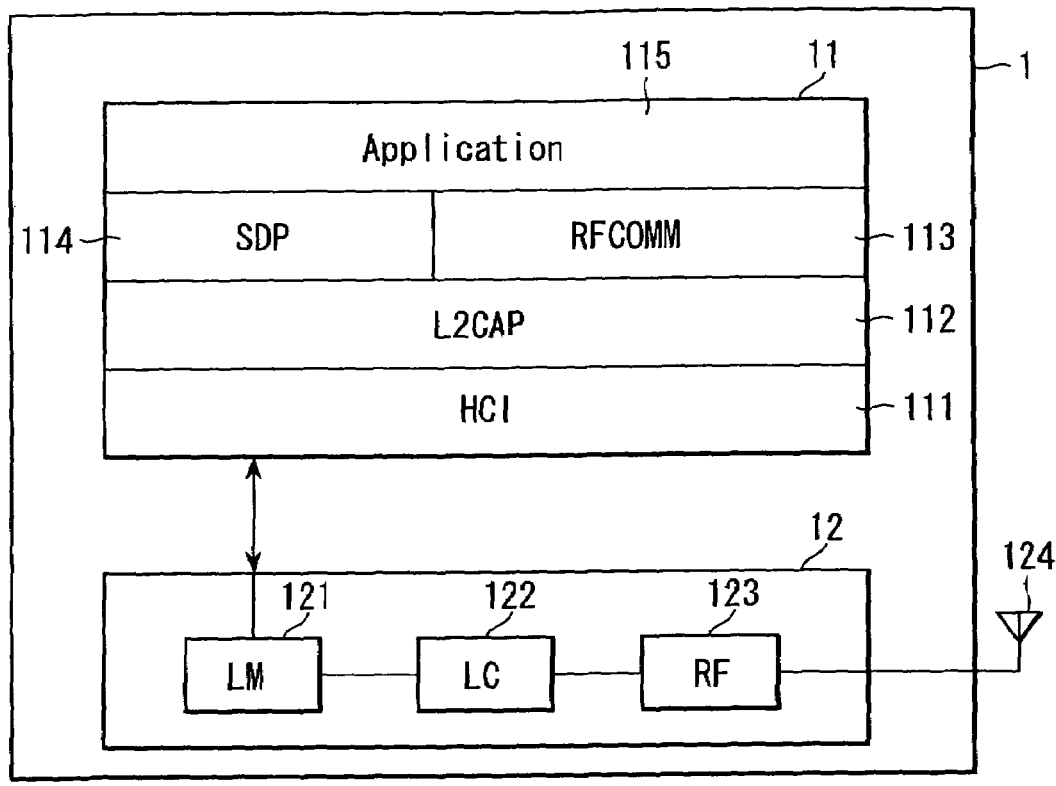
FIG. 1 is a block diagram illustrating a basic structure example of a radio terminal according to the embodiments of the invention.

FIG. 1 shows a basic structure example of a radio terminal according to the invention.

Reference numeral 11 denotes the stacked structure of the Bluetooth protocol, and reference numeral 12 a Bluetooth module.

The stacked structure 11 comprises a host control interface (HCI) as the lowest layer, a logical link (L2CAP) as the second lowest layer, a virtual COM port (RFCOMM) and Service Discovery Protocol (SDP) as the second highest layer, and an application layer as the highest layer. Actually, a radio terminal 1 comprises processing units corresponding to the respective layers, i.e., an HCI processing unit 11, L2CAP layer processing unit 112, RFCOMM processing unit 113, SDP processing unit 114 and application layer processing unit 115.

Further, the Bluetooth module 12 comprises a link manager (LM) 121, link controller (LC) 122, radio frequency circuit (RF) 123 and antenna 124.

RFCOMM or SDP data is basically processed in the following manner.

If the radio terminal 1 is an originator or transmitter, the RFCOMM processing unit 113 or the SDP processing unit 114 generates RFCOMM data or SDP data when necessary, and the L2CAP layer processing unit 112 converts the data into a packet and supplies the packet to the Bluetooth module 12 via the HCI processing unit 111. The Bluetooth module 12, in turn, executes fragmentation on the packet using the link controller 122, modulates it using the radio frequency circuit (RF) 123, and outputs it from the antenna 124.

On the other hand, if the radio terminal 1 is a destination or receiver, processing is performed in the order reverse to the above, with the result that a signal from the transmitter is finally received and processed by the RFCOMM processing unit 113 or the SDP processing unit 114.

In the description below, the above-mentioned application is not always limited to one directly operated by a user via an interface, such as a graphical user interface (GUI). For example, the application may be so-called middleware that is not directly operated by a user but operates in accordance with an instruction from an application existing in an upper layer.

Descriptions will now be given of radio terminals having configurations similar to the above.

Processing units used in the radio terminals can be realized only by hardware such as semiconductor chips. Alternatively, a CPU may be installed in the radio terminals so that part or the whole processing can be realized by software. In the case of realizing the processing using software, the software may be recorded in a recording medium installed beforehand in a computer, or in a computer-readable recording medium, such as a CD-ROM, or may be acquired from a communication medium, such as the Internet.

Firstly, a first embodiment will be described.

First Embodiment

Figure 2:
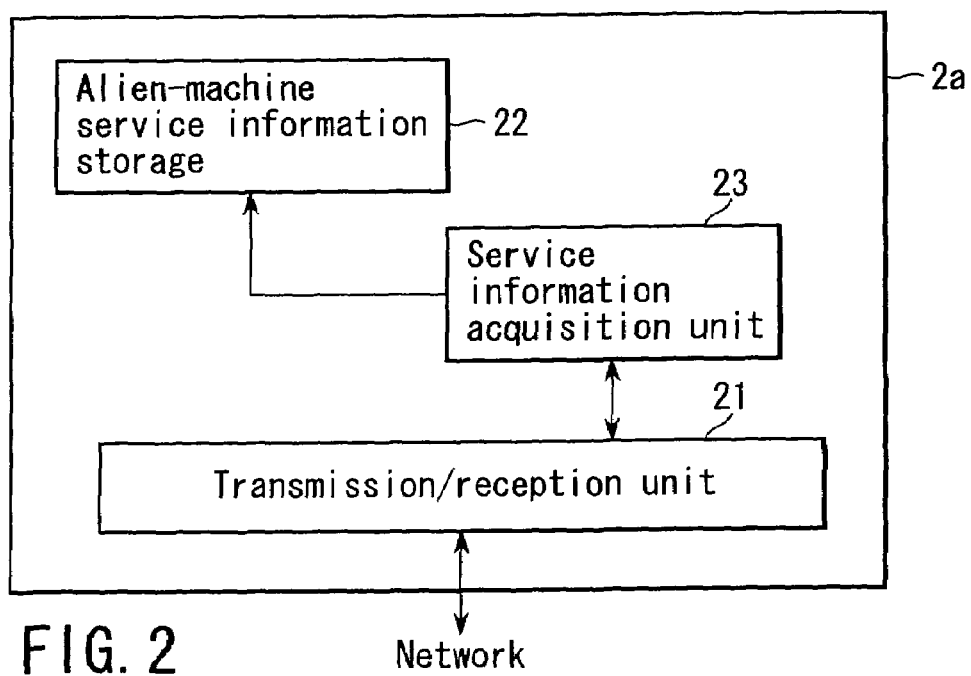
FIG. 2 is a block diagram illustrating a configuration example of a first radio terminal used in a first embodiment of the invention.

FIG. 2 shows a configuration example of a first radio terminal employed in a first embodiment. As seen from FIG. 2, a radio terminal 2*a* comprises a transmission/reception unit 21 for transmitting and receiving a request to transmit service information (service information transmission request message) or service information, to and from any other radio terminal, an alien-machine service information storage 22 for storing service information received from any other radio terminal, and a service information acquisition unit 23 for requesting any other radio terminal to transmit service information.

Figures 3, 4, 5:
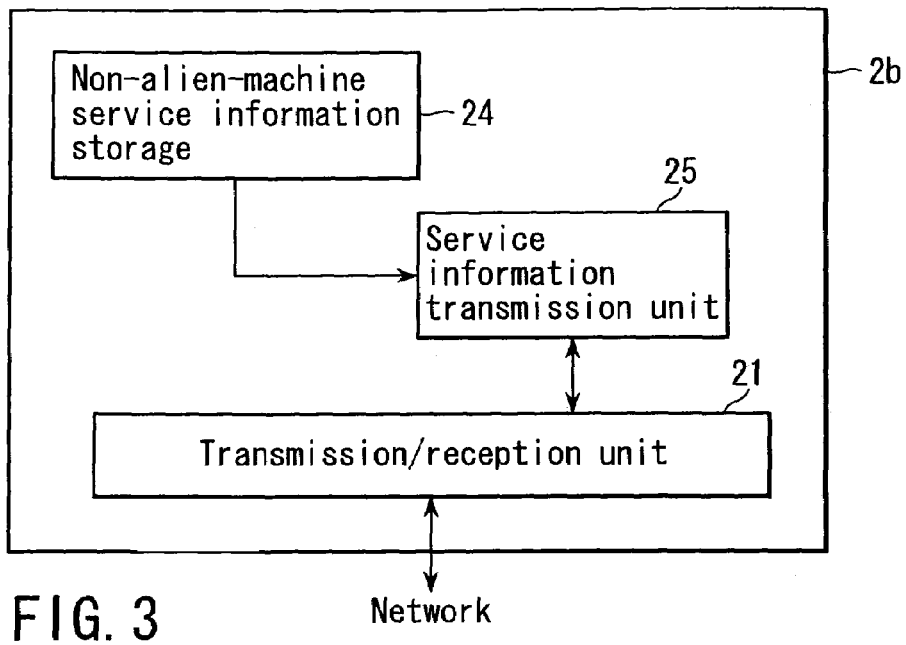
FIG. 3 is a block diagram illustrating a configuration example of a second radio terminal used in the first embodiment of the invention.
FIG. 4 is an example of an alien-machine service information table.
FIG. 5 is an example of a non-alien-machine service information table.

FIG. 3 shows a configuration example of a second radio terminal used in the first embodiment. As seen from FIG. 3, a radio terminal 2*b* comprises a transmission/reception unit 21 for transmitting and receiving a request to transmit service information transmission request or service information, to and from any other radio terminal, a non-alien-machine service information storage 24 for storing service information for the second radio terminal itself, and a service information transmission unit 25 for transmitting the service information to any other radio terminal in accordance with a request therefrom.

The configurations of FIGS. 2 and 3 correspond to the stacked structure of FIG. 1 in the following manner. The transmission/reception unit 21 corresponds to all layers not higher than the L2CAP layer in FIG. 1 (i.e., 12, 111, 112), the service information transmission unit 25 and service information acquisition unit 23 correspond to the SDP layer (114), and the non-alien-machine and alien-machine service information storages 24 and 22 correspond to the application layer (115). The element corresponding to the RFCOMM layer 113 in FIG. 1 is not referred to in this embodiment therefore not shown in FIG. 2 or 3.

In the second radio terminal 2*b* of FIG. 3, information concerning services that the terminal 2*b* itself can provide is stored as a non-alien-machine service information table in the non-alien-machine service information storage 24. FIG. 4 shows an example of the non-alien-machine service information table. In the example of FIG. 4, the non-alien-machine service information table stores, in relation to each other, the type and name of each service and a server channel number used for establishment of a connection for data transmission/reception.

In the first radio terminal 2*a* of FIG. 2, information concerning services provided by other radio terminals is stored as an alien-machine service information table in the alien-machine service information storage 22. FIG. 5 shows an example of the alien-machine service information table. In the example of FIG. 5, the alien-machine service information table stores, in relation to each other, the terminal identifier (MAC ID) of any other radio terminal, the type and name of each service provided by any other radio terminal, and a server channel number used for establishment of a connection for data transmission/reception.

The operation of the first embodiment will be described.

Figure 6:
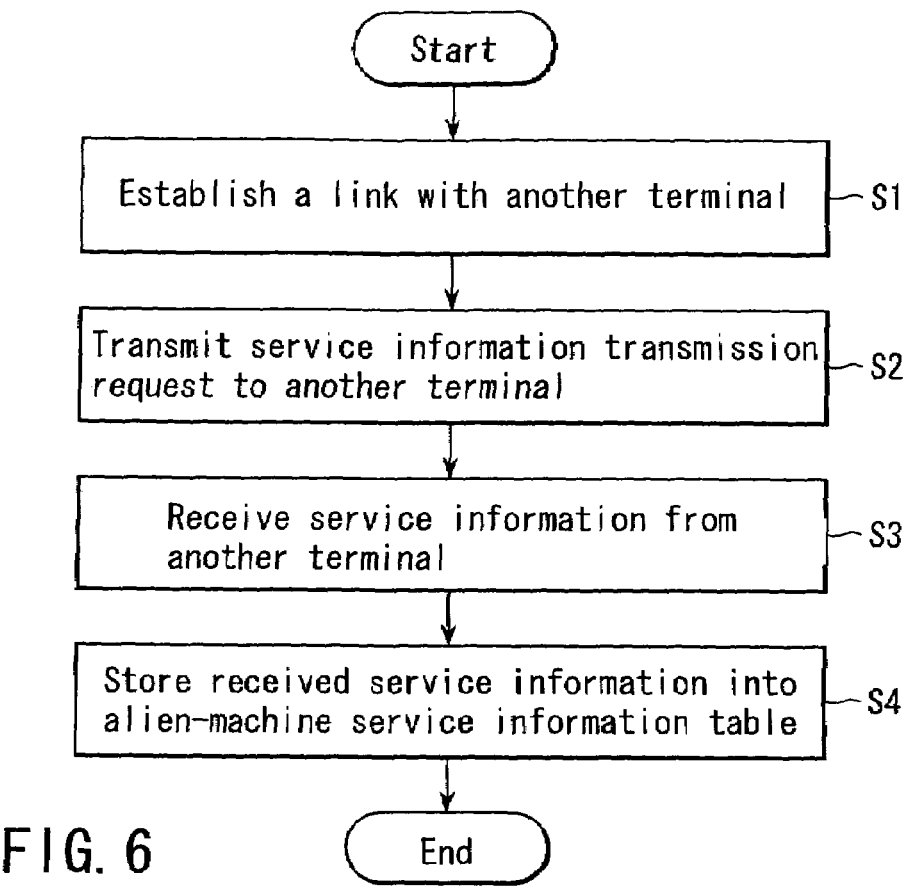
FIG. 6 is a flowchart illustrating a procedure example for operating a first radio terminal used in the first embodiment of the invention.
Figure 7:
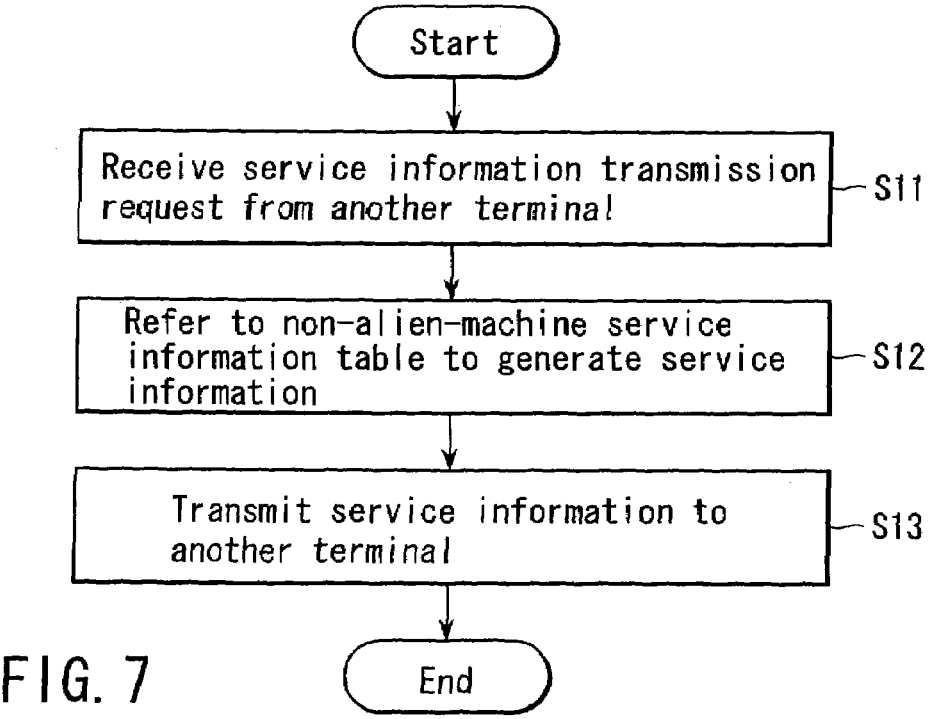
FIG. 7 is a flowchart illustrating a procedure example for operating a second radio terminal used in the first embodiment of the invention.

FIG. 6 illustrates a procedure example for operating the first radio terminal 2*a*, and FIG. 7 illustrates a procedure example for operating the second radio terminal 2*b*.

In the embodiment, it does not matter what type of method radio terminals use to acquire the identifier of any other radio terminal. Assuming that the first radio terminal 2*a* has already acquired the identifier (MAC ID) of another radio terminal, e.g., the second radio terminal 2*b*, using, for example, a known device discovery procedure, no description will be given of the procedure of acquiring the identifier.

When a link (radio link) has been established between the radio terminals 2*a* and 2*b* (step S1), the transmission/reception unit 21 supplies the service information acquisition unit 23 with an event signal indicative of the establishment of a link. Upon receiving the event signal, the service information acquisition unit 23 supplies a service information transmission request to the radio terminal 2*b* via the transmission/reception unit 21 (step S2). At this time, if no SDP connection is established between the terminals 2*a* and 2*b*, it is done so.

Assume that the type of service as a target of request is written in the service information transmission request. A user or certain application may set the type of service, or all types of service registered in the non-alien-machine service information table may be written. Further, another method may be used.

When the transmission/reception unit 21 of the radio terminal 2*b* has received the service information transmission request (step S11), it transfers the request to the service information transmission unit 25. The service information transmission unit 25, in turn, refers to the non-alien-machine service information storage 24, thereby determining whether or not the non-alien-machine service information table stores a service corresponding to the type of service requested by the service information transmission request. If the table stores the corresponding service, the name, server channel number, etc., of the service are acquired, thereby creating service information with the name and server channel number corresponding to the requested type of service, or service information indicating that there is no requested type of service (step S12). After that, the service information transmission unit 25 transmits the service information to the radio terminal 2*a* via the transmission/reception unit 21 (step S13).

When the transmission/reception unit 21 of the radio terminal 2*a* has received the service information (step S3), it transfers the information to the service information acquisition unit 23. The service information acquisition unit 23 stores the service information into the alien-machine service information table (step S4). If the unit 21 has received service information indicating that there is no requested type of service, this information may be stored in the area of the alien-machine service information table, to which the identifier of the radio terminal 2*a* and the service name and server channel number corresponding to the service type are assigned.

At the above step S1, it does not matter whether connection is established from the radio terminal 2*a* or from the radio terminal 2*b*, or for what purpose connection is established. For example, the radio terminals 2*a* and 2*b* may be linked for a RFCOMM connection or SDP connection. At any rate, when the radio terminals 2*a* and 2*b* are linked, the radio terminal 2*a* attempts to acquire service information is from the radio terminal 2*b*.

As previously mentioned, it may be difficult to establish the SDP connection between a certain terminal and another. It is needed to be linked in the lower layer for establishing the SDP connection. Since it is difficult to be linked in the lower layer, it may be difficult to establish the SDP connection. On the other hand, in the embodiment, an SDP connection is superposed on the already established link. Therefore, service information can be acquired quickly and reliably.

The first radio terminal 2*a* shown in FIG. 2 does not have the service information transmission unit 25 or non-alien-machine service information storage 24, while the second radio terminal 2*b* shown in FIG. 3 does not have the service information acquisition unit 23 or alien-machine service information storage 22. In other words, the first radio terminal 2*a* is assumed to be a client that only enjoys services, and the second radio terminal 2*b* is assumed to be a server that only provides services. However, a device may function as a server in relation to a certain service, or may function as a client in relation to another service. Another device may function as a server and client in relation to a single service. In light of this, it is desirable that a radio terminal be provided with both the structures of the first radio terminal 2*a* and the second radio terminal 2*b*.

Figure 8:
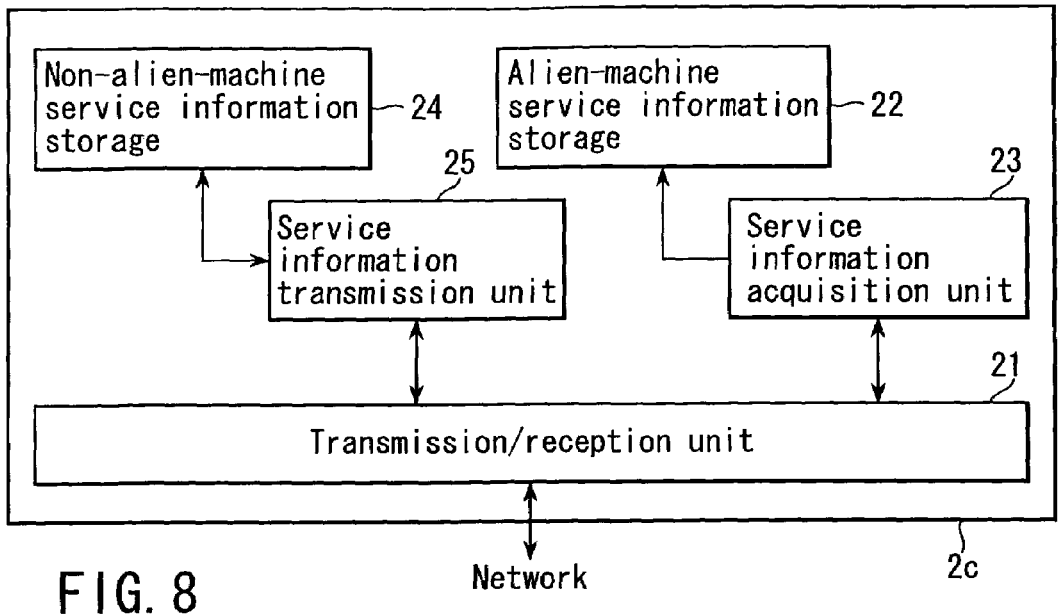
FIG. 8 is a block diagram illustrating a configuration example of a third radio terminal used in the first embodiment.

FIG. 8 shows a third radio terminal 2*c* provided with both the structures of the first radio terminals 2*a* and the second radio terminals 2*b*. By virtue of this structure, the third radio terminal 2*c* can perform both the operations of the first radio terminals 2*a* and second radio terminals 2*b*. For example, if the third radio terminal 2*c* serves as a client in relation to a certain service, it executes the operation of the first radio terminal 2*a*. If it serves as a server in relation to a certain service, it executes the operation of the second radio terminal 2*b*.

The embodiments (2-1) and (2-2) will now be described.

Embodiment (2-1)

Figure 9:
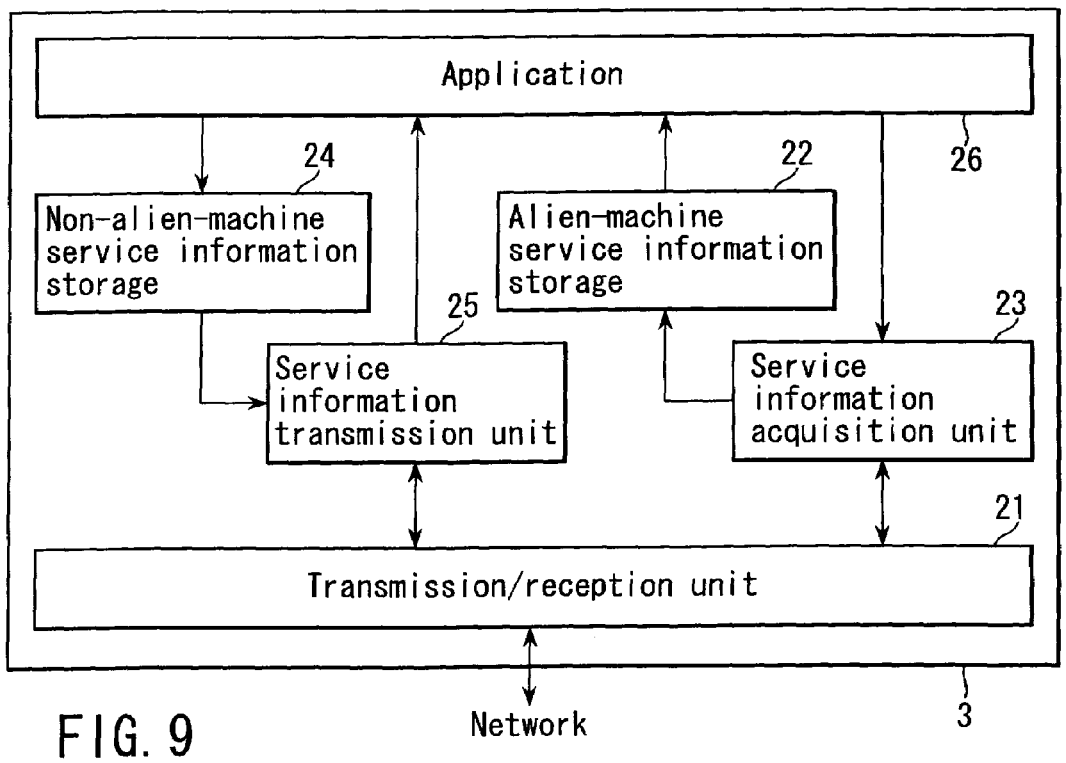
FIG. 9 is a block diagram illustrating a configuration example of a radio terminal used in embodiments (2-1) to (2-3) of the invention.

FIG. 9 shows a configuration example of a radio terminal 3 according to embodiment (2-1). The radio terminal 3 comprises a transmission/reception unit 21 for transmitting and receiving a request to transmit service information transmission request or service information, to and from any other radio terminal, an alien-machine service information storage 22 for storing service information received from any other radio terminal, a service information acquisition unit 23 for requesting any other radio terminal to transmit service information, a non-alien-machine service information storage 24 for storing service information for the second radio terminal itself, a service information transmission unit 25 for transmitting the non-alien-machine service information to any other radio terminal in accordance with a request therefrom, and an application 26.

Each part of the radio terminal 3 of FIG. 9 basically has a function similar to that of a corresponding part shown in FIG. 2, 3 or 8. Further, the application 26 is not limited to one directly operated by a user via an interface, but includes middleware.

The configuration of FIG. 9 corresponds to the stacked structure of FIG. 1 in the following manner. The transmission/reception unit 21 corresponds to all layers not higher than the L2CAP layer in FIG. 1 (i.e., 12, 111, 112), the service information transmission unit 25 and the service information acquisition unit 23 correspond to the SDP layer (114), and the non-alien-machine 24 and the alien-machine service information storages 22 correspond to the application layer (115). The element corresponding to the RFCOMM layer 113 in FIG. 1 is not referred to in this embodiment therefore not shown in FIG. 9.

The operation of this embodiment will be described.

A description will be given, referring, as a terminal A, to a radio terminal 3 that issues a service information transmission request to transmit service information, and referring, as a terminal B, to a radio terminal 3 that receives the service information transmission request.

Figures 10, 11:
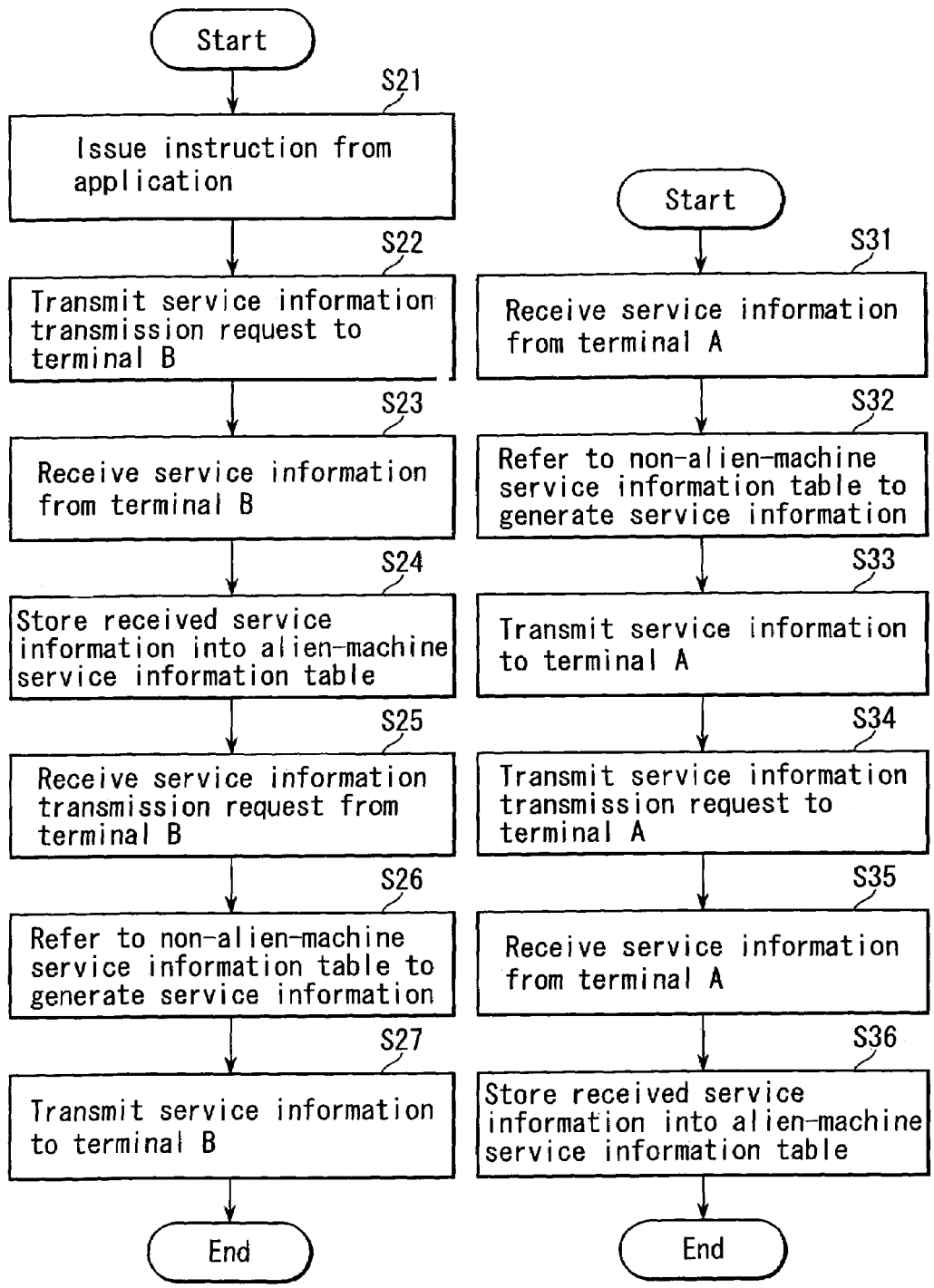
FIG. 10 is a flowchart illustrating a procedure example for operating a radio terminal A used in the embodiment (2-1)
FIG. 11 is a flowchart illustrating a procedure example for operating a radio terminal B used in the embodiment (2-1)

FIG. 10 shows a procedure example for operating the radio terminal A used in the embodiment, and FIG. 11 shows a procedure example for operating the radio terminal B used in the embodiment.

Firstly, the application 26 of the terminal A designates the identifier of the terminal B and the type of service to be acquired, thereby requesting the service information acquisition unit 23 to acquire service information from the terminal B (step S21). The service information acquisition unit 23 of the terminal A transmits the request to transmit service information corresponding to the designated service, to the terminal B via the transmission/reception unit 21 (step S22). If no SDP connection is established to the radio terminal 2*b*, it is superposed on the current link between the terminals. Further, when the terminals A and B are linked, an SDP connection is superposed on the link, whereas when they are not linked, they are linked before the establishment of an SDP connection.

Upon receiving the service information transmission request (step S31), the transmission/reception unit 21 of the terminal B transfers it to the service information transmission unit 25. The service information transmission unit 25, in turn, refers to the non-alien-machine service information table in the non-alien-machine service information storage 24, thereby determining whether or not a service corresponding to the service type requested by the service information transmission request is registered in the non-alien-machine service information table. If it is registered, its name and sever channel number, etc. are acquired, thereby creating service information containing the name and server channel number corresponding to the requested type of service, or service information indicating that there is no corresponding service (step S32). After that, the service information transmission unit 25 transmits this service information to the terminal A via the transmission/reception unit 21 (step S33).

Upon receiving the service information (step S23), the transmission/reception unit 21 of the terminal A transfers the information to the service information acquisition unit 23. The service information acquisition unit 23 stores the service information into the alien-machine service information table (step S24).

On the other hand, in this embodiment, the service information transmission unit 25 of the terminal B supplies the application 26 with an event signal indicating that the service information transmission request from the terminal A. Upon receiving this event signal, the application 26 instructs the service information acquisition unit 23 to acquire service information from the terminal A.

After that, processing similar to (but in a reverse order) the processing executed by the terminal A to acquire service information from the terminal B is performed at the steps S22-S24 and S31-533. As a result, the terminal B acquires service information from the terminal A and stores it into the alien-machine service information table (steps S34-S36 and S25-S27). However, since the application 26 of the terminal A has already instructed the service information acquisition unit 23 to acquire service information from the terminal B, it does not again issue an instruction to acquire service information from the terminal B even when it has received, from the service information transmission unit 25, an event signal indicating that a service information transmission request has been received from the terminal B. This is only one different point.

In the procedures shown in FIGS. 10 and 11, the service information transmission unit 25 of the terminal B generates an event signal indicative of the reception of a service information transmission request, when it has actually received the request. However, this event signal may be generated at another point in time. For example, the event signal may be generated when establishment of an SDP connection for generation of a service information transmission request is detected.

Further, in the procedure of FIG. 11, the terminal B transmits a service information transmission request at a step S34 after transmitting service information at a step S33. Alternatively, the terminal B may transmit a service information transmission request before the transmission of service information, for example, when it receives a service information transmission request from the terminal A, or when it detects establishment of an SDP connection by the terminal A. In this case, for example, transfer of service information from the terminal A to the terminal B is performed parallel to transfer of service information from the terminal B to the terminal A.

Further, it is not always necessary for a terminal to provide service information to another terminal. Terminals do not establish a connection for data transmission/reception with terminals that provide no service information. However, even such terminals that provide no service information can establish a connection for data transmission/reception with other terminals. In such terminals, the non-alien-machine service information storage 24 stores no information. If, in this state, the service information transmission unit 25 receives a service information transmission request from another terminal, it is sufficient if a message that there is no service is returned to the terminal.

In the above processing, the terminal A establishes an SDP connection with the terminal B for acquiring service information from the terminal B, and disconnects the SDP connection after finishing the acquisition of the service information from the terminal B. However, even after the completion of the acquisition of the service information, the SDP connection may be kept until the terminal B finishes acquisition of service information from the terminal A. Further, the SDP connection may be continued a period of time after the completion of the acquisition of service information from the terminal B. This can avoid a case where the terminal B delays in processing an event signal indicative of the reception of a request to transmit service information, and the connection between the terminals A and B is cut by the terminal A before the application 26 of the terminal B instructs the service information acquisition unit 23 to acquire the service information from the terminal A.

In the prior art, when the terminal A has acquired service information from the terminal B, it can establish a connection for data transmission/reception with the terminal B. In this state, however, the terminal B cannot establish a connection for data transmission/reception with the terminal A, since it does not acquire service information from the terminal A. On the other hand, in the embodiment, when the terminal A has acquired service information from the terminal B, the terminal B has simultaneously acquired service information from the terminal A. Accordingly, the terminal A can establish a connection for data transmission/reception with the terminal B, and the terminal B can also establish a connection for data transmission/reception with the terminal A.

The radio terminal 3 of the embodiment may have the same function as that of the terminal A or B, or both of the functions.

Embodiment (2-2)

A radio terminal example according to embodiment (2-2) is the same as that of the embodiment (2-1) shown in FIG. 9, and each part of the embodiment (2-2) has basically the same function as a corresponding part in the embodiment (2-1).

Further, operations of the terminal A of the embodiment (2-2) is basically the same as that of the terminal A of the embodiment (2-1).

In this embodiment, the points different from the embodiment (2-1) will be mainly described.

In the terminal B of the embodiment (2-2), the steps S34-S36 are not executed if the terminal B has already acquired service information from the terminal A.

Specifically, as in the embodiment (2-1), when the transmission/reception unit 21 of the terminal B has received a request to transmit service information, it transfers the request to the service information transmission unit 25, which, in turn, supplies the application 26 with an event signal indicative of the reception of the service information transmission request from the terminal A. Upon receiving this event signal, however, the application 26 determines whether or not there is service information relating to the terminal A and the same service as requested. If there is no such service information, the application 26 requests the service information acquisition unit 23, to acquire the service information from the terminal A, as in the embodiment (2-1). On the other hand, if there is the service information, nothing is done.

If the terminal B does not execute the steps S34-S36, the terminal A accordingly does not execute the steps S25-S27.

In the above-described embodiment (2-1), upon receiving an event signal indicating that a request to transmit service information has been supplied from the terminal A, the application 26 of the terminal B always requests the terminal A to transmit service information. On the other hand, in this embodiment, if the terminal B has ever acquired service information from the terminal A, it does not request again the terminal A to transmit service information. Thus, in this embodiment, useless communication in which the same service information is acquired again and again is avoided.

Figures 12, 13:
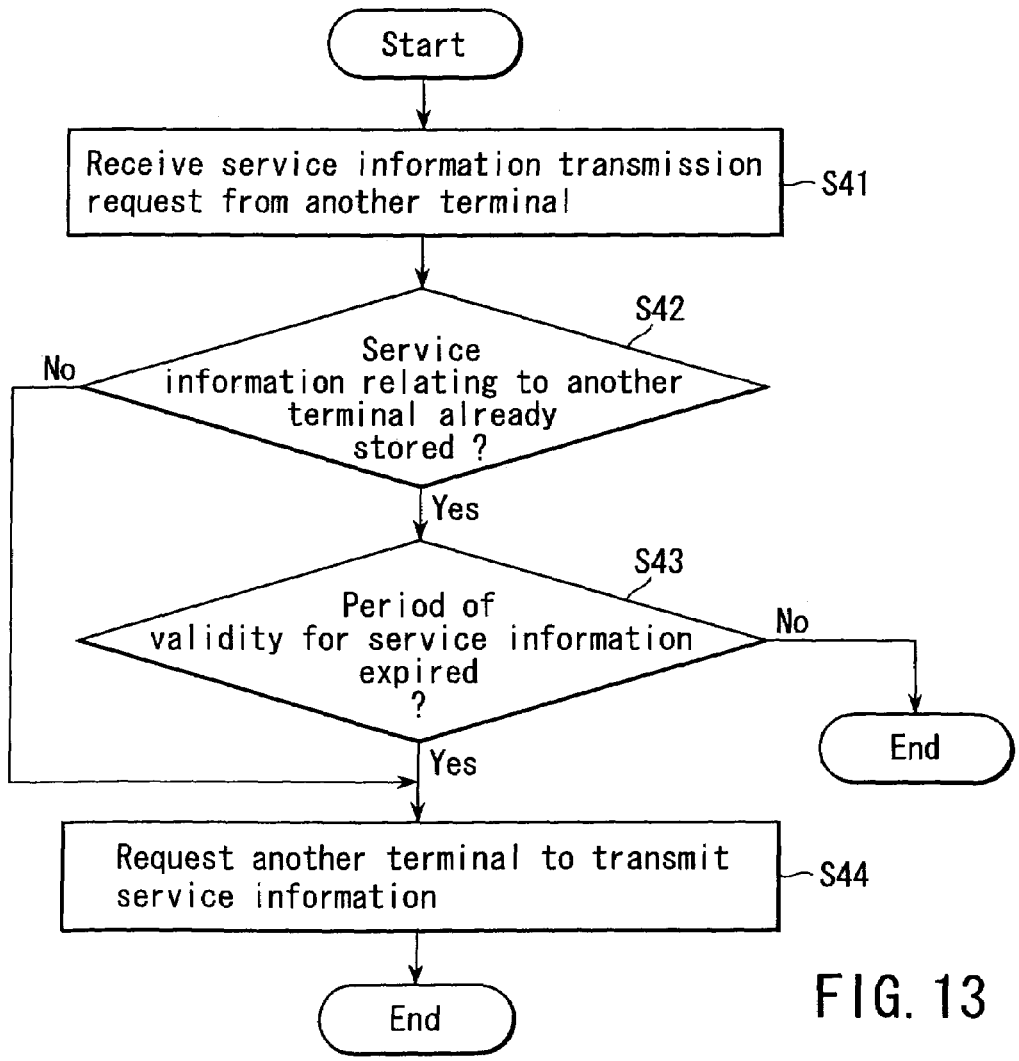
FIG. 12 is another example of the service information table for the originator terminal.
FIG. 13 is a flowchart illustrating a procedure example for operating a radio terminal B used in the embodiment (2-2)

However, it may not be preferable to continue to use old service information, since service information is changed if the service provided by a terminal is changed. In light of this, time information may be added to the information stored in the alien-machine service information table, which enables appropriate information updating. FIG. 12 shows such an alien-machine service information table. In this example, a field for writing the acquisition time of service information is added in the table shown in FIG. 5.

In this case, the terminal B operates in substantially the same manner as the above, but in a different manner only when the application 26 of the terminal B receives an event signal indicating that a request to transmit service information has been received from the terminal A.

FIG. 13 shows an example of this operation.

Upon receiving the event signal (step S41), the application 26 of the terminal B refers to the alien-machine service information table in the alien-machine service information storage 22, thereby determining whether or not the table stores service information relating to the terminal A and the same service as requested in the service information transmission request from the terminal A. If the table does not store this service information (step S42), the application 26 instructs the service information acquisition unit 23 to acquire the service information from the terminal A (step S44). Further, if the table stores the service information (step S42), the acquisition time of the service information is compared with the present time. If the service information is determined to be old from the time comparison (step S43), the application 26 instructs the service information acquisition unit 23 to acquire service information from the terminal A (step S44). On the other hand, if the service information is determined not to be old (step S44), nothing is executed.

As a result, old service information can be appropriately updated.

The expiration time at which service information is determined old can be changed in accordance with the type of service. For example, concerning a service provided by an application that is frequently activated and terminated, or a service whose content is frequently changed during the operation of an application, the period of validity is shortened. On the other hand, concerning a service provided by a continuously activated application during the operation of a terminal, or a service whose content is not so frequently changed, the period of validity is lengthened. As a result, service information whose content is known not to be so frequently changed is not repeatedly acquired, thereby reducing the degree of useless communication.

Embodiment (2-3)

A radio terminal example according to embodiment (2-3) is similar to that of the embodiment (2-1) shown in FIG. 9, and each part of the embodiment (2-3) has basically the same function as a corresponding part in the embodiment (2-1).

Further, operations of the terminal A of the embodiment (2-3) is basically the same as that of the terminal A of the embodiment (2-1).

In this embodiment, the points different from the embodiment (2-1) will be mainly described.

In the terminal B of the embodiment (2-3), it is determined on the basis of the type of service whether or not a request to transmit service information should be generated. If it is not necessary to acquire service information, the steps S34-S36 are not executed.

Specifically, as in the embodiment (2-1), upon receiving a request to transmit service information, the transmission/reception unit 21 of the terminal B transfers the request to the service information transmission unit 25. The service information transmission unit 25, in turn, supplies the application 26 with an event signal indicating that the request to transmit service information has been received from the terminal A. Upon receiving the event signal, the application 26 of the embodiment (2-3) determines whether or not service information concerning the same service as requested in the service information transmission request from the terminal A should be acquired from the terminal A. If it is determined that such service information should be acquired, the application 26 instructs the service information acquisition unit 23 to acquire the service information from the terminal A, as in the embodiment. (2-1), while it is determined that such service information should not be acquired, nothing is executed.

If the terminal B does not execute the steps S34-S36, the terminal A accordingly does not execute the steps S25-S27.

At this time, the terminal B operates in a manner similar to that described in the embodiment (2-2). However, the terminal B performs a determination procedure different from that shown in FIG. 13 upon receiving an event signal indicating that the application 26 of the terminal B has received, from the terminal A, a request to transmit service information.

Figure 14:
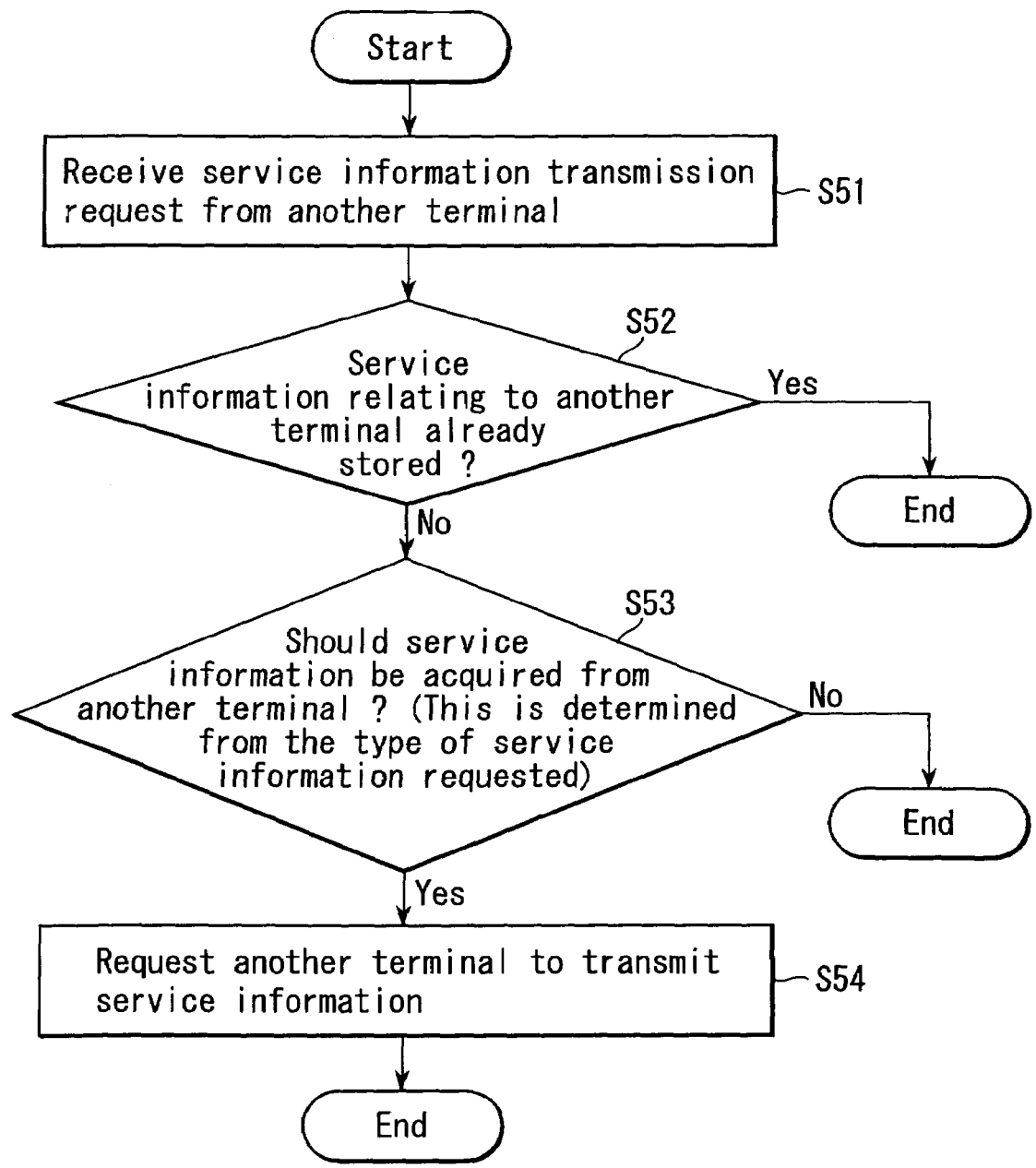
FIG. 14 is a flowchart illustrating a procedure example for operating a radio terminal B used in the embodiment (2-3)

FIG. 14 shows an example of this procedure.

Upon receiving the event signal (step S51), the application 26 of the terminal B refers to the alien-machine service information table in the alien-machine service information storage 22, thereby determining whether or not the table stores service information relating to the terminal A and the same service as requested in the service information transmission request from the terminal A. If the table stores this service information (step S52), nothing is done. If the table does not store the service information (step S52), the application 26 determines whether or not the service information relating to the same service as requested in the service information transmission request from the terminal A should be acquired from the terminal A (step S53). If it is determined that the service information should be acquired, the application 26 instructs the service information acquisition unit 23 to acquire the service information from the terminal A (step S54). If the service information should not be acquired (step S53), nothing is done.

For electronic conferences, there is an application, such as a chat application, which enables each of the devices participating in a conference to establish a connection with any other device for data transmission/reception. Further, there is another application for use in, for example, a presentation for distributing a material, which enables only one device as a presenter to establish a connection for data transmission/reception with the other devices as an audience, i.e., which enables only one device to transmit data and treat the other devices as receivers.

In the former application, each device needs to acquire service information from the other devices, whereas in the latter application, only the device as the transmitter needs to acquire service information from the other devices, but not vice versa.

The embodiment (2-3) is useful in these two cases, since it discriminates the case where acquisition of service information from peripheral devices is needed, from the case where the acquisition is not needed, thereby enabling service information to be acquired only when necessary. As a result, no extra service information transmission and reception is performed, therefore communication lines can be used efficiently.

Embodiments (3-1) and (3-2) will be described.

Embodiment (3-1)

Figure 15:
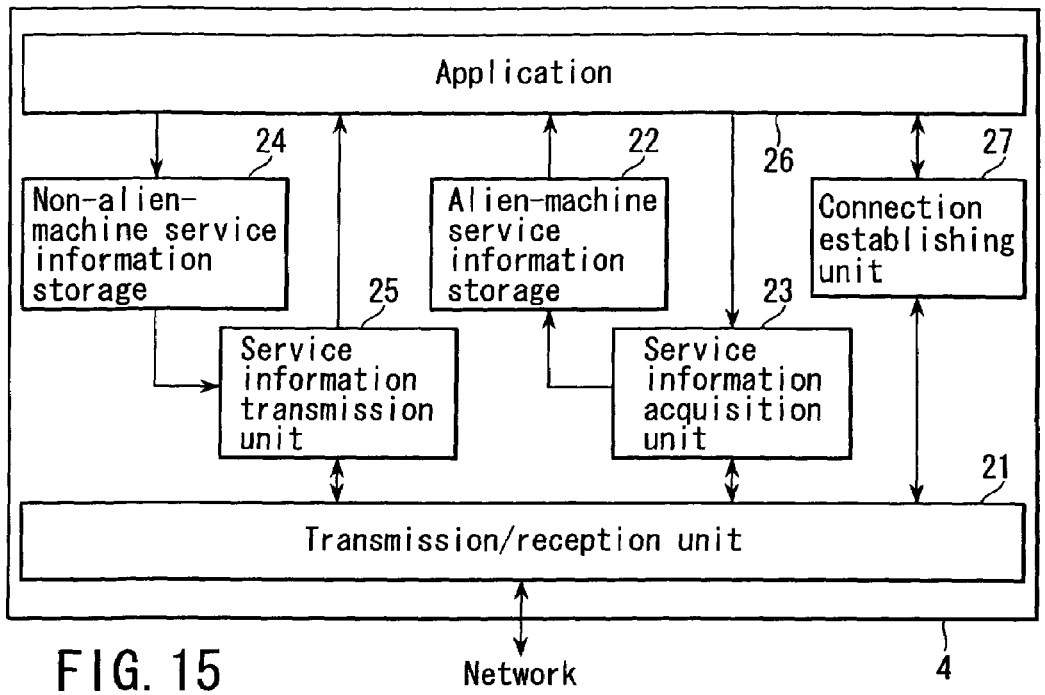
FIG. 15 is a block diagram illustrating a configuration example of a radio terminal used in embodiments (3-1) to (3-3) of the invention.

FIG. 15 shows a radio terminal example according to embodiment (3-1). As seen from FIG. 15, a radio terminal 4 comprises a transmission/reception unit 21 for transmitting and receiving a request to transmit service information transmission request or service information, to and from any other radio terminal, an alien-machine service information storage 22 for storing service information received from any other radio terminal, a service information acquisition unit 23 for requesting any other radio terminal to transmit service information, a non-alien-machine service information storage 24 for storing service information for the radio terminal 4 itself, a service information transmission unit 25 for transmitting the service information to any other radio terminal in accordance with a request therefrom, an application 26, and a connection establishing unit 27. In short, the radio terminal 4 of this embodiment is obtained by adding the connection establishing unit 27 to the structure of the radio terminal 3 of the embodiment (2-1) shown in FIG. 9.

Each part of the radio terminal 4 of FIG. 15 basically has a function similar to that of a corresponding part shown in FIG. 2, 3 or 8. Further, the application 26 is not limited to one directly operated by a user via an interface, but includes middleware. The connection establishing unit 27 establishes a connection for data transmission/reception with another terminal on the basis of the information stored in the alien-machine service information storage 22. The transmission/reception unit 21 transmits and receives a request to transmit service information transmission request or service information, to and from any other radio terminal, and establishes a connection for data transmission/reception with any other radio terminal for data transmission/reception in accordance with a request from the connection establishing unit 27.

The configuration of FIG. 15 corresponds to the stacked structure of FIG. 1 in the following manner. The transmission/reception unit 21 corresponds to all layers not higher than the L2CAP layer in FIG. 1 (i.e., 12, 111, 112), the service information transmission unit 25 and service information acquisition unit 23 correspond to the SDP layer (114), and the non-alien-machine 24 and alien-machine service information storages 22 correspond to the application layer (115).

The operation of this embodiment will be described.

A description will be given, referring, as a terminal A, to a radio terminal 4 that first issues a request to establish a connection for data transmission/reception, and referring, as a terminal B, to a radio terminal 4 that receives the request.

In this embodiment, assume that when the application 26 of the terminal A establishes a connection for data transmission/reception with the application 26 of the terminal B for communication, the terminal A acquires service information from the terminal B using a certain procedure, for example, the same procedure as employed in the embodiment (2-1). This is because the identifier (MAC ID) of the terminal B and the server channel number contained in the service information of the terminal B are needed for the establishment of a connection for data transmission/reception with the terminal B. However, this embodiment differs from the embodiment (2-1) in that the terminal B does not supply the terminal A with a request to transmit the service information of the terminal A when having received, from the terminal A, a request to transmit the service information of the terminal B.

Figures 16, 17:
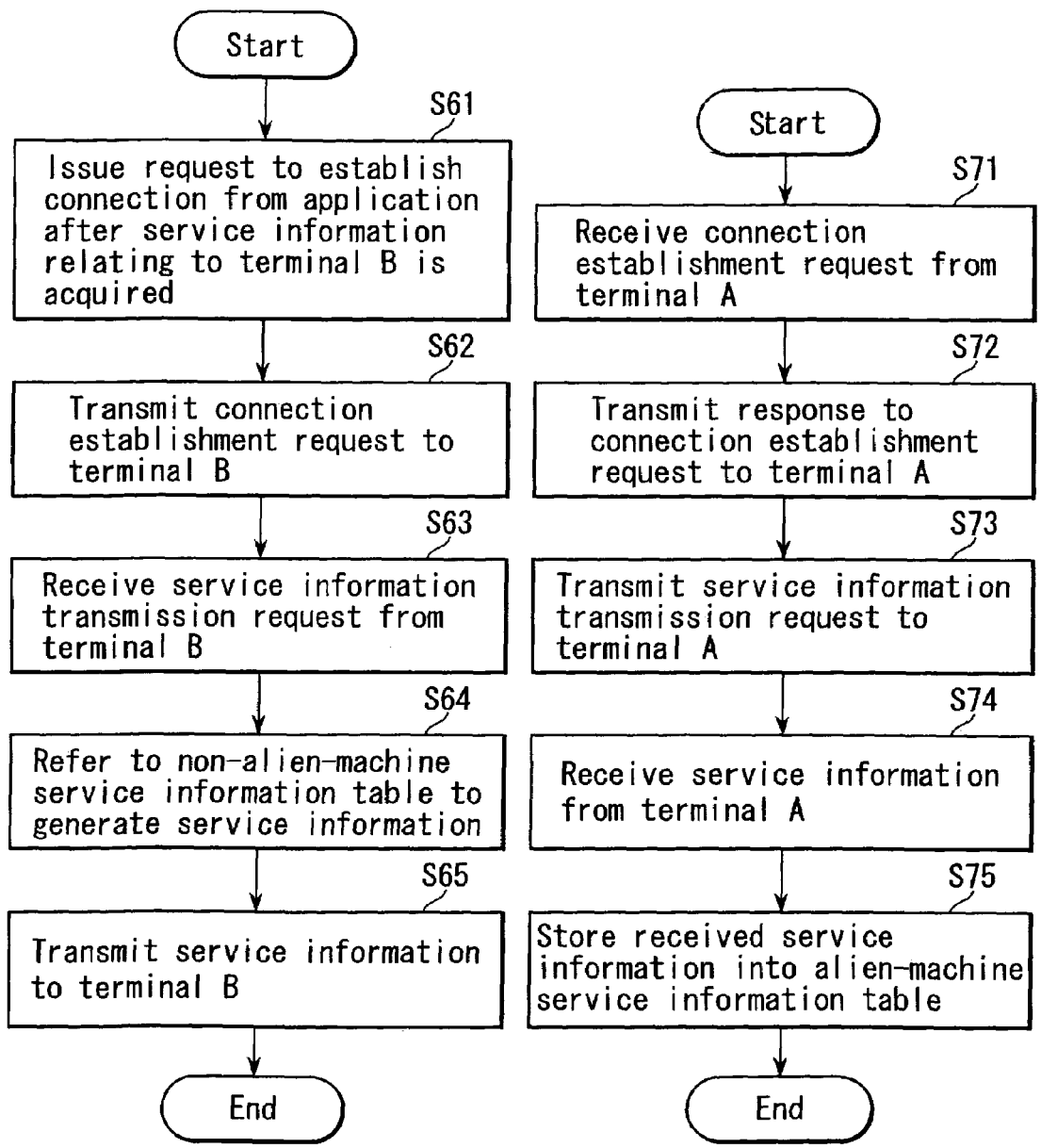
FIG. 16 is a flowchart illustrating a procedure example for operating a radio terminal A used in the embodiment (3-1)
FIG. 17 is a flowchart illustrating a procedure example for operating a radio terminal B used in the embodiment (3-1)

FIG. 16 illustrates an operation procedure example of the terminal A in this embodiment, and FIG. 17 illustrates an operation procedure example of the terminal B in this embodiment.

Firstly, after having acquired service information from the terminal B, the application 26 of the terminal A requests the connection establishing unit 27 to establish a connection for data transmission/reception with the terminal B, using, as parameters, the identifier of the terminal B and the server channel number contained in the alien-machine service information of the terminal B (step S61). The request to establish a connection for data transmission/reception may include the type of service as another parameter, in addition to the device identifier and server channel number. Upon receiving the request to establish a connection for data transmission/reception, the connection establishing unit 27 of the terminal A transfers this request to the connection establishing unit 27 of the terminal B via the transmission/reception units 21 of the terminals A and B (step S62).

Upon receiving the request to establish a connection for data transmission/reception (step S71), the connection establishing unit 27 of the terminal B returns a response to the request to the terminal A. (step S72), thereby completing the establishment of a connection for data transmission/reception with the terminal A. At this time, the connection establishing unit 27 of the terminal B supplies the application 26 of the terminal B with an event signal indicating that a connection for data transmission/reception with the terminal A has been established.

Upon receiving the event signal, the application 26 of the terminal B requests the service information acquisition unit 23 to acquire, from the terminal A, service information concerning the type of service corresponding to the server channel number that is related to the above connection establishing request. The service information acquisition unit 23 of the terminal B supplies, via the transmission/reception unit 21, the terminal A with a request to transmit service information containing the designated service type (step S73). At this time, if no SDP connection is established with the terminal A, an SDP connection is superposed upon the already established connection with the terminal A.

Upon receiving the service information transmission request (step S63), the transmission/reception unit 21 of the terminal A transfers the request to the service information transmission unit 25. The service information transmission unit 25, in turn, refers to the non-alien-machine service information storage 24, thereby determining whether or not the non-alien-machine service information table stores a service corresponding to the type of service requested by the service information transmission request. If the table stores the corresponding service, the name, server channel number, etc., of the service are acquired, thereby creating service information containing the name and/or server channel number corresponding to the requested type of service, or service information indicating that there is no corresponding service (step S64). After that, the service information transmission unit 25 transmits the service information to the terminal B via the transmission/reception unit 21 (step S65).

Upon receiving the service information transmission request (step S74), the transmission/reception unit 21 of the terminal B transfers the request to the service information acquisition unit 23. The service information acquisition unit 23 stores the service information into the alien-machine service information table (step S75).

In the procedures shown in FIGS. 16 and 17, the connection establishing unit 27 of the terminal B generates an event signal when the establishment of a connection for data transmission/reception has been completed. However, this event signal may be generated at another point in time. For example, it may be generated when a request to establish a connection for data transmission/reception has been received.

In the above processing, the terminal A establishes a connection for data transmission/reception with the terminal B to access the application 26 of the terminal B, and cuts the connection when communication with the application 26 of the terminal B has been completed. However, the connection may be maintained, even after the completion of communication, until the terminal B finishes acquisition of service information from the terminal A. Further, the connection may be continued a period of time after the completion of the acquisition of service information from the terminal B. This can avoid a case where the terminal B delays in processing an event signal indicative of the reception of a request to transmit service information, and the connection between the terminals A and B is cut by the terminal A before the application 26 of the terminal B instructs the service information acquisition unit 23 to acquire the service information from the terminal A.

The radio terminal 3 of the embodiment may have the same function as that of the terminal A or B, or both of the functions.

Embodiment (3-2)

The relationship between the embodiment (3-2) and the embodiment (3-1) is basically similar to that between the embodiment (2-2) and the embodiment (2-1).

A radio terminal example according to the embodiment (3-2) is similar to that of the embodiment (3-1) shown in FIG. 15, and each part of the embodiment (3-2) has basically the same function as a corresponding part in the embodiment (3-1).

Further, operations of the terminal A of the embodiment (3-2) is basically the same as that of the embodiment (3-1).

In this embodiment, the points different from the embodiment (3-1) will be mainly described.

In the terminal B of the embodiment (3-2), if service information has already been acquired from the terminal A, steps S73-S75 are not executed.

Specifically, like the embodiment (3-1), the terminal A establishes a connection for data transmission/reception with the terminal B after having acquired service information from the terminal B, and the connection establishing unit 27 of the terminal B supplies the application 26 of the terminal B with an event signal. In this embodiment, however, the application 26 refers, upon receiving the event signal, to the alien-machine service information table in the alien-machine service information storage 22, thereby determining whether or not the table stores service information of the terminal A concerning the type of service corresponding to the server channel number that is related to a connection establishing request from the terminal A. If the table does not store the service information, the application 26 instructs the service information acquisition unit 23 to acquire service information from the terminal A. If the table already stores the service information, nothing is performed.

If the terminal B does not execute the steps S73-S75, the terminal A accordingly does not execute the steps S63-S65.

In the above-described embodiment (3-2), if the terminal B has ever acquired service information from the terminal A, it does not request again the terminal A to transmit service information, as in the embodiment (2-2). Accordingly, also in this embodiment, useless communication in which the same service information is acquired again and again is avoided.

Also in this embodiment, information can be updated using time information stored in the alien-machine service information table, as in the embodiment (2-2). In this case, the alien-machine service information table may be similar to that of the embodiment (2-2) shown in FIG. 12.

The operation of updating information by the terminal B is substantially the same as that in the embodiment (2-2), except for the operation performed when the application 26 of the terminal B receives an event signal indicating that a connection for data transmission/reception has been established by the terminal A.

Figure 18:
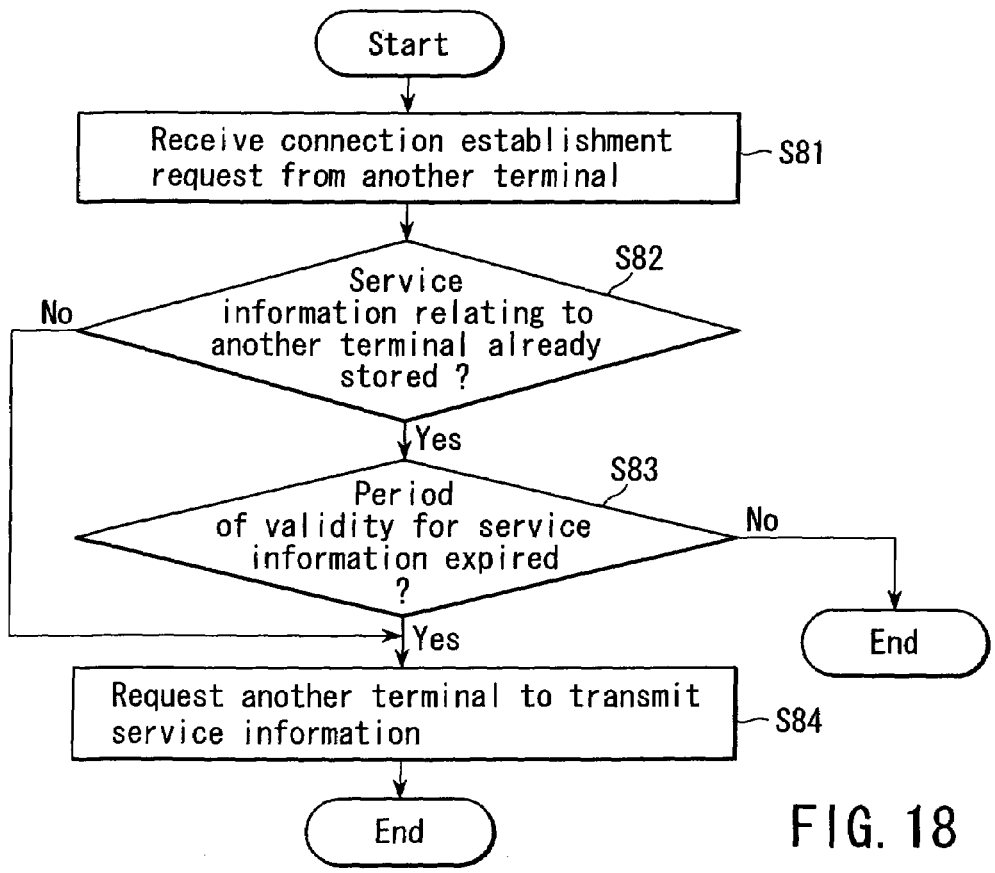
FIG. 18 is a flowchart illustrating a procedure example for operating a radio terminal B used in the embodiment (3-2)

FIG. 18 illustrates a procedure example performed in this case.

Upon receiving the above-mentioned event signal (step S81), the application 26 of the terminal B refers to the alien-machine service information table in the alien-machine service information storage 22, thereby determining whether or not the table stores service information concerning the type of service corresponding to the server channel number that is related to the above-mentioned connection establishing request from the terminal A. If the table does not store this service information (step S82), the application 26 instructs the service information acquisition unit 23 to acquire the service information from the terminal A (step S84). Further, if the table stores the service information (step S82), the acquisition time of the service information is compared with the present time. If the service information is determined to be old from the time comparison (step S83), the application 26 instructs the service information acquisition unit 23 to acquire service information from the terminal A (step S84). On the other hand, if the service information is determined not to be old (step S84), nothing is executed.

As a result, old service information can be appropriately updated, as in the embodiment (2-2).

Further, as in the embodiment (2-2), the expiration time at which service information is determined old can be changed in accordance with the type of service. This enables useless communication to be reduced.

Embodiment (3-3)

The relationship between the embodiment (3-3) and the embodiment (3-1) is basically similar to that between the embodiment (2-3) and the embodiment (2-1).

A radio terminal example according to the embodiment (3-3) is similar to that of the embodiment (3-1) shown in FIG. 15, and each part of the embodiment (3-3) has basically the same function as a corresponding part in the embodiment (3-1).

Further, operations of the terminal A of the embodiment (3-3) is basically the same as that of the terminal A of the embodiment (3-1).

In this embodiment, the points different from the embodiment (3-1) will be mainly described.

In the terminal B of the embodiment (3-3), it is determined from the type of service whether or not transmission of service information should be requested, and if it is not necessary to acquire service information, the steps S73-S75 are not executed.

Specifically, as in the embodiment (3-1), the terminal A establishes a connection for data transmission/reception with the terminal B after having acquired service information from the terminal B, and the connection establishing unit 27 of the terminal B supplies the application 26 of the terminal B with an event signal. In this embodiment, however, the application 26 determines, upon receiving the event signal, whether or not service information concerning the type of service corresponding to the server channel number that is related to a connection establishing request from the terminal A should be acquired from the terminal A. If it is determined that the service information should be acquired, the application 26 instructs the service information acquisition unit 23 to acquire the service information from the terminal A, as in the embodiment (2-1). If it is determined that the service information should not be acquired, nothing is performed.

If the terminal B does not execute the steps S73-S75, the terminal A accordingly does not execute the steps S63-S65.

The manner of determination by the terminal B is substantially the same as in the embodiment (3-2) (e.g. FIG. 18), except for the operation performed when the application 26 of the terminal B receives an event signal indicating that a connection for data transmission/reception has been established by the terminal A.

Figure 19:
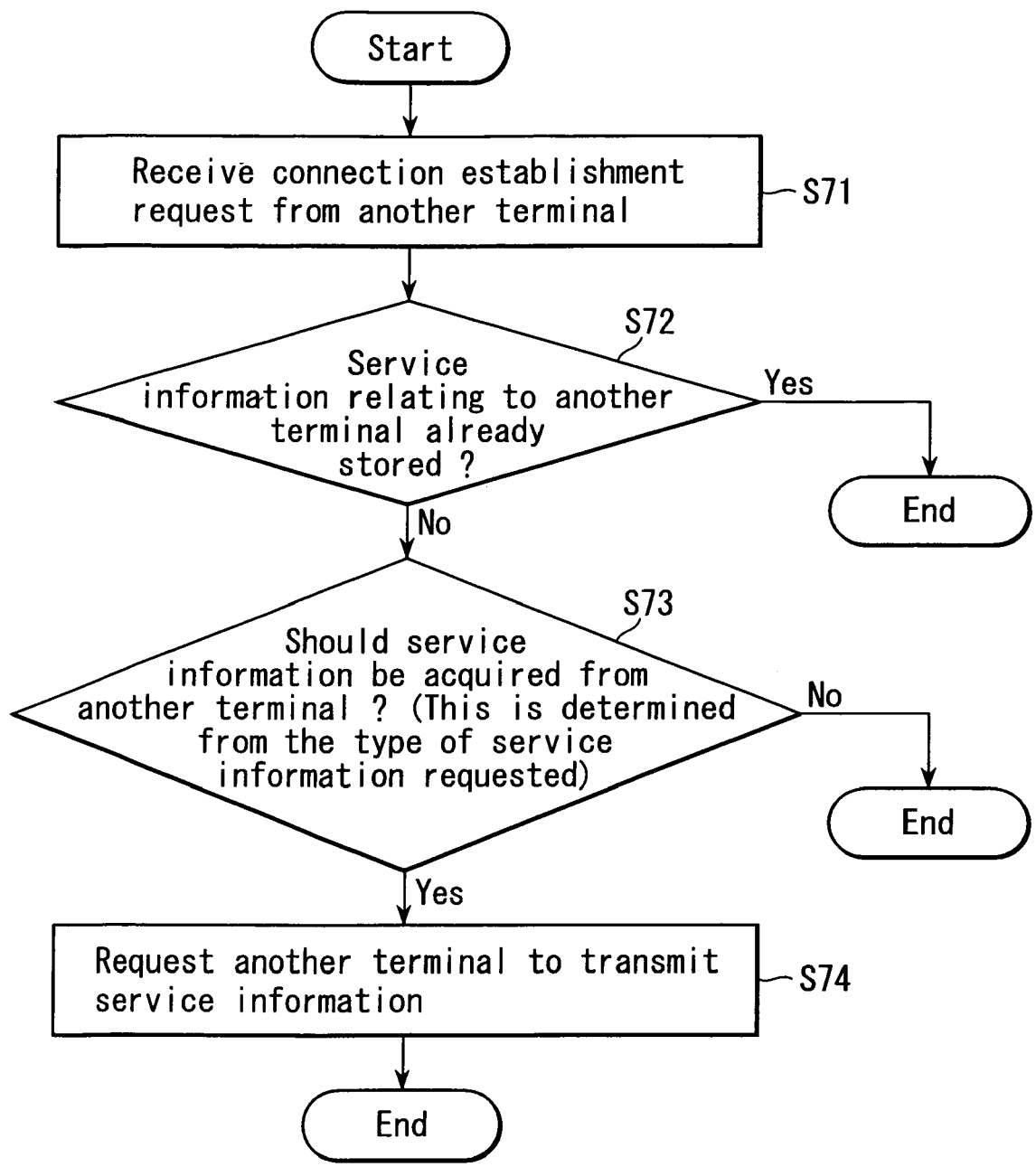
FIG. 19 is a flowchart illustrating a procedure example for operating a radio terminal B used in the embodiment (3-3).

FIG. 19 illustrates a procedure example performed in this case.

Upon receiving the above-mentioned event signal (step S71), the application 26 of the terminal B refers to the alien-machine service information table in the alien-machine service information storage 22, thereby determining whether or not the table stores service information concerning the type of service corresponding to the server channel number that is related to the above-mentioned connection establishing request from the terminal A. If the table stores this service information (step S72), nothing is performed. If, on the other hand, the table does not store it (step S72), the application 26 determines whether or not the service information concerning the type of service corresponding to the server channel number that is related to the connection establishing request from the terminal A should be acquired (step S73). If it is determined that the service information should be acquired, the application 26 instructs the service information acquisition unit 23 to acquire the service information from the terminal A (step S74). If it is determined that the service information should not be acquired, nothing is performed.

As in the embodiment (2-3), the case where acquisition of service information from peripheral devices is needed is discriminated from the case where the acquisition is not needed, thereby enabling service information to be acquired only when necessary. As a result, no extra service information transmission and reception is performed, therefore communication lines can be used efficiently.

As described above, the radio terminal of the embodiments can promptly acquire service information needed to establish a connection with another radio terminal.

For example, when the radio terminal of the embodiments has detected establishment of a link between itself and another radio terminal, it acquires service information from the linked radio terminal. Thus, service information is promptly and reliably acquired.

Further, in the embodiments, when a terminal A acquires service information from a terminal B, the terminal B acquires service information from the terminal A. Thus, both the terminals A and B can promptly acquire, from each other, service information needed to establish a connection for data transmission/reception.

Furthermore, in the embodiments, when, for example, the terminal A establishes a connection for data transmission/reception with the terminal B, the terminal B acquires service information from the terminal A. Thus, the terminal B can promptly acquire the service information of the terminal A.

The flow charts of the embodiments illustrate methods and systems according to the embodiments of the invention. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block of blocks. The computer program instructions may also be loaded onto a computer or other programmable apparatus to cause a series of operational steps to be performed on the computer or other programmable apparatus to produce a computer programmable apparatus provide steps for implementing the functions specified in the flowchart block or blocks.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio terminal comprising:
an establishing unit configured to establish a radio link based on a radio link layer communication protocol with respect to an other radio terminal, the radio link layer communication protocol defining one or more radio link layer communication services;
a setting unit configured to set, on the radio link, a virtual serial port connection with the other radio terminal based on second service information concerning radio link layer services provided by the other radio terminal, the virtual serial port connection being used for transmitting or receiving data of the second service information and first service information concerning radio link layer services provided by the radio terminal, and the virtual serial port connection including a Bluetooth RFCOMM connection or a Service Discovery Protocol (SDP) connection; and
a transmission/reception unit configured to
receive, from the other radio terminal via the virtual serial port connection, a first request message representing that the first service information should be transmitted to the other radio terminal,
transmit the first service information to the other radio terminal via the virtual serial port connection, when the transmission/reception unit receives an event indicating reception of the first request message transmitted from the other radio terminal,
transmit, to the other radio terminal via the virtual serial port connection, a second request message representing that the second service information should be transmitted to the radio terminal, when the transmission/reception unit receives the event, and
receive the second service information from the other radio terminal via the virtual serial port connection.

2. The radio terminal according to claim 1, wherein the transmission/reception unit transmits the second request message if the radio terminal unpossesses information corresponding to the second service information.

3. The radio terminal according to claim 2, wherein the transmission/reception unit transmits the second request message if the radio terminal needs the second service information.

4. The radio terminal according to claim 1, wherein the transmission/reception unit transmits the second request message representing that the first service information contained a server channel number for setting the connection by which the radio terminal acquires a service.

5. The radio terminal according to claim 1, wherein the transmission/reception unit transmits the second request message containing information indicative of a type of service, the type of service representing that the second service information should be transmitted.

6. A communication control method of setting a connection on a radio link based on a radio link layer communication protocol between a radio terminal and an other radio terminal, the radio link layer communication protocol defining one or more radio link layer communication services, and the method comprising:
establishing the radio link with respect to the other radio terminal;

setting, on the radio link, a virtual serial port connection with the other radio terminal based on second service information concerning radio link layer services provided by the other radio terminal, the virtual serial port connection being used for transmitting or receiving data of the second service information and first service information concerning radio link layer services provided by the radio terminal, and the virtual serial port connection including a Bluetooth RFCOMM connection or a Service Discovery Protocol (SDP) connection;

receiving, from the other radio terminal via the virtual serial port connection, a first request message representing that the first service information should be transmitted to the other radio terminal;

transmitting the first service information to the other radio terminal via the virtual serial port connection, when an event indicating reception of the first request message transmitted from the other radio terminal is received;

transmitting, to the other radio terminal via the virtual serial port connection, a second request message representing that the second service information should be transmitted to the radio terminal, when the event is received; and receiving the second service information from the other radio terminal via the virtual serial port connection.

7. A radio terminal comprising:

an establishing unit configured to establish a radio link based on a radio link layer communication protocol with respect to an other radio terminal, the radio link layer communication protocol defining one or more radio link layer communication services;

a setting unit configured to set, on the radio link, a virtual serial port connection with the other radio terminal based on second service information concerning radio link layer services provided by the other radio terminal, the virtual serial port connection being used for transmitting or receiving data of the second service information and first service information concerning radio link layer services provided by the radio terminal, and the virtual serial port connection including a Bluetooth RFCOMM connection or a Service Discovery Protocol SDP connection; and a transmission/reception unit configured to receive, from the other radio terminal via the virtual serial port connection, a first request message representing that the first service information should be transmitted to the other radio terminal, transmit the first service information to the other radio terminal via the virtual serial port connection, when the transmission/reception unit receives an event indicating reception of the first request message transmitted from the other radio terminal, determine whether or not the radio terminal acquires the second service information, when the first receiving unit receives the event, transmit, to the other radio terminal via the virtual serial port connection, a second request message representing that the second service information should be transmitted to the radio terminal, when the transmission/reception unit determines the radio terminal acquires the second service information, and receive the second service information from the other radio terminal via the virtual serial port connection.

8. The radio terminal according to claim 7, wherein the transmission/reception unit transmits the second request message if the radio terminal unpossesses information corresponding to the second service information.

9. The radio terminal according to claim 7, wherein the transmission/reception unit transmits the second request message if the radio terminal needs the second service information.

10. The radio terminal according to claim 7, wherein the transmission/reception unit transmits the second request message representing that the first service information contained a server channel number for setting the connection by which the radio terminal acquires a service.

11. The radio terminal according to claim 7, wherein the transmission/reception unit transmits the second request message contained information indicative of a type of service, the type of service representing that the second service information should be transmitted.

12. A communication control method of setting a connection on a radio link based on a radio link layer communication protocol between a radio terminal and an other radio terminal, the radio link layer communication protocol defining one or more radio link layer communication services, and the method comprising:

establishing the radio link with respect to the other radio terminal;

setting, on the radio link, a virtual serial port connection with the other radio terminal based on second service information concerning radio link layer services provided by the other radio terminal, the virtual serial port connection being used for transmitting or receiving data of the second service information and first service information concerning radio link layer services provided by the radio terminal, and the virtual serial port connection including a Bluetooth RFCOMM connection or a Service Discovery Protocol (SDP) connection;

receiving, from the other radio terminal via the virtual serial port connection, a first request message representing that the first service information should be transmitted to the other radio terminal;

transmitting the first service information to the other radio terminal via the virtual serial port connection, when an event indicating reception of the first request message transmitted from the other radio terminal is received;

determining whether or not the radio terminal acquires the second service information, when the event is received;

transmitting, to the other radio terminal via the virtual serial port connection, a second request message representing that the second service information should be transmitted to the radio terminal, when the determining determines whether the radio terminal acquires the second service information; and receiving the second service information from the other radio terminal via the virtual serial port connection.

13. A computer readable medium storing program instructions which, when executed by a computer, cause the computer to perform steps comprising:

establishing a radio link based on a radio link layer communication protocol from a radio terminal with respect to an other radio terminal, the radio link layer communication protocol defining one or more radio link layer communication services;

setting, on the radio link, a virtual serial port connection with the other radio terminal based on second service information concerning radio link layer services provided by the other radio terminal, the virtual serial port connection being used for transmitting or receiving data of the second service information and first service information concerning radio link layer services provided by the radio terminal, and the virtual serial port connection including a Bluetooth RFCOMM connection or a Service Discovery Protocol (SDP) connection;

receiving, from the other radio terminal via the virtual serial port connection, a first request message representing that the first service information should be transmitted to the other radio terminal;

transmitting the first service information to the other radio terminal via the virtual serial port connection, when an event indicating reception of the first request message transmitted from the other radio terminal is received;

transmitting, to the other radio terminal via the virtual serial port connection, a second request message representing that the second service information should be transmitted to the radio terminal, when the event is received; and receiving the second service information from the other radio terminal via the virtual serial port connection.

14. A computer readable medium storing program instructions which, when executed by a computer, cause the computer to perform steps comprising:

establishing a radio link based on a radio link layer communication protocol from a radio terminal with respect to an other radio terminal, the radio link layer communication protocol defining one or more radio link layer communication services;

setting, on the radio link, a virtual serial port connection with the other radio terminal based on second service information concerning radio link layer services provided by the other radio terminal, the virtual serial port connection being used for transmitting or receiving data of the second service information and first service information concerning radio link layer services provided by the radio terminal, and the virtual serial port connection including a Bluetooth RFCOMM connection or a Service Discovery Protocol (SDP) connection;

receiving, from the other radio terminal via the virtual serial port connection, a first request message representing that the first service information should be transmitted to the other radio terminal;

transmitting the first service information to the other radio terminal via the virtual serial port connection, when an event indicating reception of the first request message transmitted from the other radio terminal is received;

determining whether or not the radio terminal acquires the second service information, when the event is received;

transmitting, to the other radio terminal via the virtual serial port connection, a second request message representing that the second service information should be transmitted to the radio terminal, when the determining determines whether the radio terminal acquires the second service information; and receiving the second service information from the other radio terminal via the virtual serial port connection.

* * * * *